Dec. 6, 1938.    F. L. MOSELEY ET AL    2,139,558
FOLLOW-UP SYSTEM FOR GYRO COMPASSES
Original Filed Aug. 29, 1935    2 Sheets-Sheet 1

INVENTORS
FRANCIS L. MOSELEY
WILLIAM T. COOKE
CARL A. FRISCHE
BY
Herbert H. Thompson
THEIR ATTORNEY.

Patented Dec. 6, 1938

2,139,558

UNITED STATES PATENT OFFICE 2,139,558

FOLLOW-UP SYSTEM FOR GYRO COMPASSES

Francis L. Moseley, Pelham, William T. Cooke, Pelham Manor, N. Y., and Carl A. Frische, Leonia, N. J., assignors to Sperry Gyroscope Company, Inc., Brooklyn, N. Y., a corporation of New York Application August 29, 1935, Serial No. 38,378
Renewed October 16, 1936

10 Claims. (Cl. 172—239)

This invention relates, generally, to electrical follow-up systems, and the invention has reference, more particularly, to an electrical follow-up for remote control systems wherein the position of a control element or sending instrument, such as the sensitive element of a gyroscopic compass, controls the position of a follow-up element or other receiving device.

In most follow-up systems heretofore used, there is a decided tendency for the follow-up element to "hunt" around its position of rest or coincidence with the position of the sensitive element, that is, to mechanically oscillate back and forth through a small arc across this position. There are many objections to mechanical hunting because, among other things, it sets up similar oscillations in the repeater compasses driven from the master compass, rendering them difficult to read.

The principal object of the present invention is to provide a novel electrical follow-up system for gyro compasses and for other purposes that substantially eliminates hunting of the follow-up element, the said system being so constructed and arranged as to cause the follow-up element to move in substantial synchronism with the apparent movement of the sensitive element.

Another object of the present invention lies in the provision of a novel follow-up system of the above character wherein the follow-up motor driving the follow-up element is not only operated in response to the change in relative angular position of the sensitive and follow-up elements, but in addition this motor is also operated in response to one or more higher derivatives of the relative angular displacement of the sensitive and follow-up elements with respect to time.

Still another object of the present invention is to provide a novel follow-up system of the above character that employs electron tube means, to which is supplied a signal voltage responsive to the relative angular displacement of the sensitive and follow-up elements, said electron tube means serving partly as a rectifier and partly as an amplifier, the amplified alternating signal voltage being applied to the grids of grid controlled rectifier means, whereas the rectified signal voltage is applied across the primary winding of a transformer so that a D. C. component flows therein, the magnitude of which depends on the relative displacement of the sensitive element with respect to the follow-up element, said primary winding serving, in the event said D. C. component varies, to produce across the transformer secondary winding a voltage that is in phase with the time rate of change of displacement; this first derivative voltage being applied to impedance means designed so that a potential proportional to the rate of change of this voltage with respect to time is produced, such derived D. C. surge potential or voltage corresponding to the second time derivative of the displacement voltage, i. e., $$\frac{d^2\theta}{dt^2}$$

or acceleration of the sensitive element with respect to the follow-up element; the said derived D. C. potential being passed along with the amplified A. C. displacement signal potential onto the grids of said grid controlled rectifier means that control the follow-up motor actuating the follow-up element, whereby the torque applied to the follow-up element is responsive to the relative displacement and acceleration of the sensitive element with respect to the follow-up element.

Other objects and advantages will become apparent from the specification, taken in connection with the accompanying drawings wherein the invention is embodied in concrete form.

While this invention is illustrated as applied to the follow-up of a gyro compass, it will be understood that it is applicable to other follow-up and remote control systems.

Figure 1:
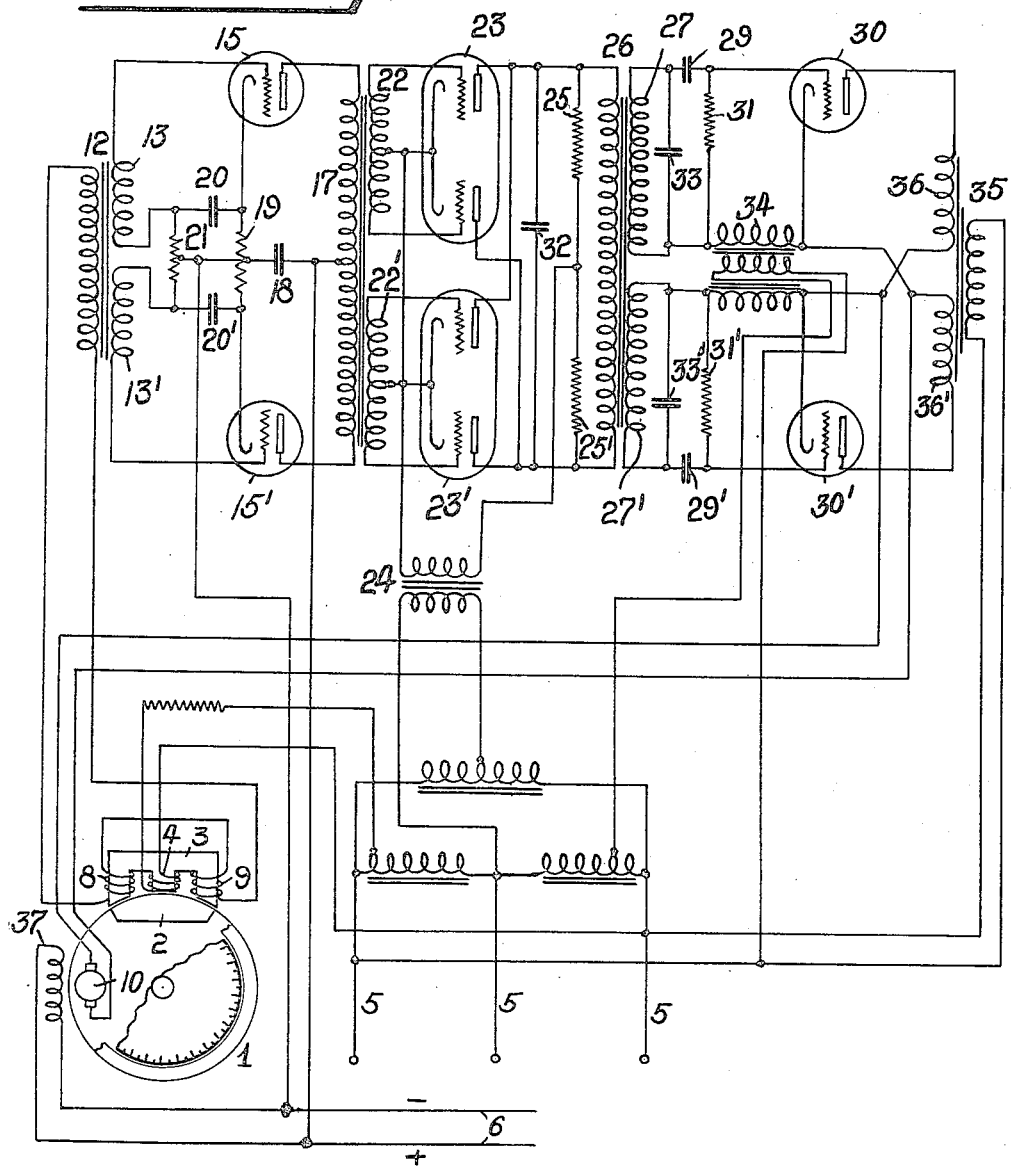
Fig. 1 is a wiring diagram illustrating the novel follow-up system of the present invention.

Referring to Fig. 1, the reference numeral 1 designates a gyroscopic compass, the sensitive element of which carries a small piece or armature 2 of magnetic material, such as soft iron. The other part of the controller comprises a double transformer member 3 carried by the compass follow-up element. The central or primary winding 4 of member 3 is supplied with A. C. from three phase leads 5. The two outer secondary windings 8 and 9 are preferably placed on the outer legs of the transformer so that the part 2 completes the magnetic circuit between the several legs of the transformer and by relative movement of the two parts of the controller, the E. M. F. generated in the two coils 8 and 9 is differentially varied. The output of these coils is supplied to the novel electrical control system of this invention, the output of which drives, preferably in connection with the A. C. supply, the reversible follow-up motor 10.

According to the preferred arrangement, the controller windings 8 and 9 are connected in series circuit with the primary winding of a transformer 12 having a split secondary winding consisting of winding sections 13 and 13' which are respectively connected in the input circuits of amplifier tubes 15 and 15'. The cathode-plate circuits of tubes 15 and 15' are supplied from D. C. leads 6, the plate potential of these tubes being furnished through the center tap of the primary winding of a transformer 17 having a split secondary winding. A plate by-pass condenser 18 is connected in the external circuit between the plates and cathodes of tubes 15 and 15'. The reference numeral 19 designates the grid bias resistance and condensers 20, 20' and resistance 21 provide decoupling capacitance and resistance. Cathode heater circuits are omitted in the drawings for the sake of simplification. Since the outputs of tubes 15 and 15' are both supplied to the primary of transformer 17, either of these tubes could burn out or fail in use without appreciably impairing the operation of the system. It will be apparent that, if desired, but one of these amplifier tubes need be used, thereby somewhat simplifying the system, though if such single tube should fail in use, the system would become inoperative.

The primary winding of transformer 17 serves to induce an amplified version of the signal potential, supplied initially by windings 8, 9, in the secondary winding sections 22 and 22' of the transformer 17. Secondary winding section 22 has its terminals connected to the grids of an electron tube 23 having two sets of the electrodes arranged in push pull or opposition, i. e., the amplified signal potential is supplied from winding section 22 in 180° out of phase relation to the respective grids of tube 23. A. C. potential for the plate-cathode circuits of tube 23 is furnished from a transformer 24 supplied from the three phase supply 5, the plate potential being fed through resistances 25 and 25' that are arranged in shunt with respect to the primary winding of a transformer 26 having a divided secondary winding consisting of winding sections 27 and 27'.

Secondary winding section 22' has its terminals connected to the grids of an electron tube 23' that is similar to tube 23 and has its plate-cathode circuits supplied from transformer 24. Corresponding plates of tubes 23 and 23' are interconnected so that the joint potential outputs of these tubes are applied across the primary of transformer 26. Thus, it will be understood that either of the tubes 23 or 23' may fail partially or wholly in use, in which event, the remaining good tube will serve to maintain the operation of the system.

Any alternating signal voltage supplied from controller 2—3, due to relative movement of the sensitive and follow-up elements, and amplified by tubes 15 and 15', is impressed on the grids of each of the tubes 23 and 23' in 180° out of phase relation, so that such amplified signal voltage is added to the potential at one of the grids in phase with the plate voltage, and added at the other grid out of phase with the plate voltage, depending upon the phase relation of the signal, i. e., upon whether the transformer element 3 is moving in one direction or the other with respect to the element 2, and the magnitude of such amplified displacement signal potential will depend at any time upon the relative angular displacement of these elements.

Thus, tubes 23 and 23' serve as phase detectors in detecting the phase of the displacement signal corresponding to the relative direction of rotation of the element 3 with respect to the element 2, and these tubes also amplify the alternating displacement signal potential, serving to apply an amplified alternating signal potential across the primary of transformer 26, the direction of application of the potential depending upon the phase relation of the signal, i. e., upon whether the follow-up element is turning in one direction or the other with respect to the sensitive element. Amplified alternating signal potentials are thus induced in the secondary winding sections 27 and 27' which have their outer ends connected through condensers 29 and 29', respectively, to the grids of gas or vapor containing grid controlled rectifier tubes 30 and 30', so that the amplified displacement signal potential corresponding to relative displacement of members 2 and 3 is applied to the grids of one of these tubes 30 and 30'.

Tubes 23 and 23' also serve as rectifiers in that they draw current from transformer 24 through the resistances 25 and 25', the current from transformer 24 dividing between resistances 25 and 25' so that part of this current flows through one of these resistances and the remainder flows through the other.

When a displacement signal is being amplified by tubes 23 and 23', the currents flowing in the two resistances 25 and 25' will be unequal because of the phase relations between the A. C. plate supply to tubes 23 and 23' and the A. C. signal applied to the grids thereof, i. e., when the signal potential is of one phase, one of the plate circuits of each of the tubes 23 and 23' draws a large current, whereas the other plate circuit of each of these tubes draws a small current, and when the phase of the signal potential reverses due to reversed relative displacement of the sensitive and follow-up elements, the larger current is transferred to the other half of plate circuits of tube 23 and 23'.

Thus an unbalanced D. C. component flows in resistances 25 and 25', resulting in a voltage drop due to the ohmic resistance of these resistances, so that the total voltage drop thereby created across the primary of transformer 26 is in phase with the relative displacement, i. e., $\theta$, and proportional to the magnitude thereof. If this D. C. component varies, a voltage is induced in the secondary winding sections 27 and 27', which induced voltage is in phase with the time rate of change of displacement, i. e., velocity or $$\frac{d\theta}{dt}$$

This induced voltage is thus applied to condensers 29 and 29' and if this voltage is changing, the time rate of change or the first derivative thereof with respect to time is passed onto the grids of the grid controlled rectifiers 30 and 30' in 180° out of phase relation, i. e., a D. C. surge voltage corresponding to the second derivative of displacement with respect to time or $$\frac{d^2\theta}{dt^2}$$

is applied to the grids of tubes 30 and 30'. If the relative displacement of the sensitive and follow-up elements is not changing, or changing uniformly, no such voltage will appear, but if the relative displacement of the elements is changing with acceleration or deceleration, such surge voltage will appear.

Similar resistors 31 and 31' cooperate with condensers 29 and 29' in applying time derivative voltage to the grids of tubes 30 and 30', the said resistors completing the circuit for currents resulting from such voltages. A condenser 32 is connected across the primary of transformer 26 and condensers 33 and 33' are connected across the secondary winding sections 27 and 27'. Condensers 32, 33 and 33' serve to smooth out voltage ripples, the latter two condensers also serving to pass transient potentials. If desired, condenser 32 could be omitted.

As is known to those skilled in the art, the average value of the current flowing in the anode circuits of the grid controlled rectifier tubes 30 and 30' can be varied by varying the phase relationship between the voltages applied to the grids and anodes, respectively. Alternating voltage is supplied to the grids of tubes 30 and 30' in in-phase relation by means of a transformer 34 supplied from the A. C. leads 5. A transformer 35 has its primary winding supplied from A. C. leads 5 and has secondary winding sections 36 and 36' connected, respectively, in the cathode-plate circuits of tubes 30 and 30', the said transformer 35 serving to supply A. C. plate voltage to tubes 30 and 30'. The armature of follow-up motor 10 is connected in the cathode-plate circuits of both tubes 30 and 30', whereas the field winding 37 of motor 10 is supplied with D. C. from leads 6.

When tube 30 is rendered conducting, current supplied by transformer 35 flows in the cathode-plate circuit of this tube through the armature of motor 10 in one direction, thereby causing this motor to operate in one direction, whereas when tube 30' is rendered conducting, current supplied from transformer 35 flows in the cathode-plate circuit of this tube through the armature of motor 10 in the reverse direction, thereby causing this motor to operate in the reverse direction, the speed of operation of the motor at any time depending upon the magnitude of the current flowing in the cathode-plate circuit. The phase of the biasing voltage supplied to the grids of tubes 30 and 30' is so adjusted that in the absence of a signal potential or voltage, only a small standby current flows in the cathode-plate circuits of tubes 30 and 30'.

As long as the follow-up element is not displaced with respect to the sensitive element, no signal voltage is supplied to the grids of the grid controlled rectifier tubes 30 and 30', but as soon as relative displacement of these elements takes place, the amplified alternating signal potential from tubes 23 and 23', and a D. C. surge potential dependent on the second time rate of change of displacement, i. e., $$\frac{d^2\theta}{dt^2}$$

or acceleration, are impressed on the grids of tubes 30 and 30' in 180° out of phase relation, so that the resultant of such potentials is additive to the A. C. bias supplied from transformer 34 at one of the grids, thereby shifting the phase of the resultant voltage supplied to this grid and causing current to flow in the output circuit of such tube, resulting in the rotation of follow-up motor 10 in the direction necessary to synchronize the sensitive and follow-up elements.

The phase and magnitude of the combined D. C. derivative and A. C. displacement potentials determine the torque and speed of motor 10. During acceleration of the follow-up element with respect to the sensitive element, the A. C. displacement signal is greatly increased by the D. C. second derivative signal potential to give added speed to motor 10, whereas during deceleration, the A. C. displacement signal potential is reduced or possibly reversed by the D. C. second derivative signal potential to give a less or reversed torque, respectively. Hence, with proper adjustment of the parts, substantial synchronism of the sensitive and follow-up elements is obtained and without overshooting of the stopping position, i. e., "hunting".

Figure 2:
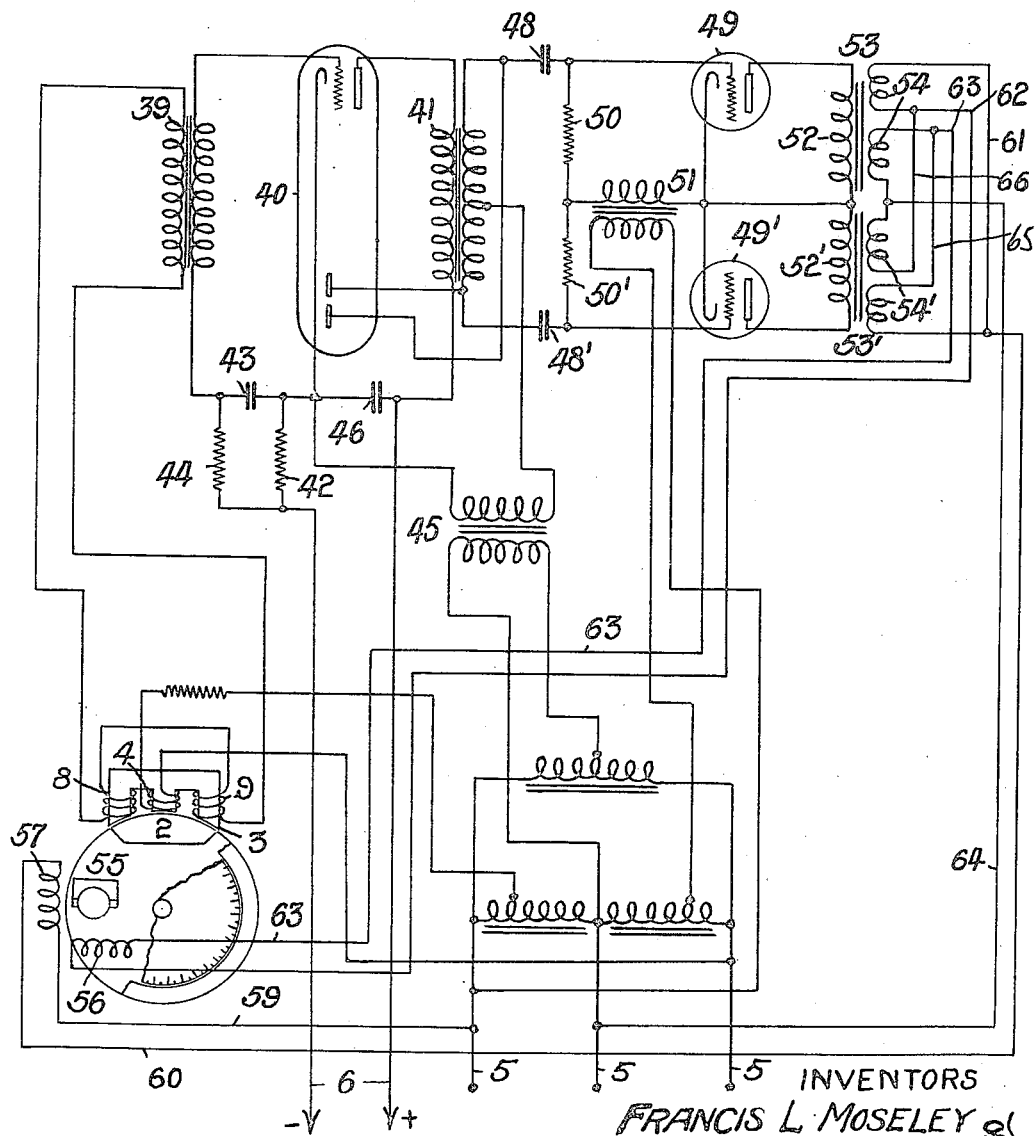
Fig. 2 is a modification of the structure of Fig. 1.

In the modified form of the invention shown in Fig. 2, parts that are similar to parts of Fig. 1 are similarly numbered. In Fig. 2, the alternating signal potential from the controller windings 8 and 9 is supplied to the primary winding of transformer 39, that amplifies this voltage somewhat and applies the same to the grid of a diode triode tube 40. Plate potential is supplied to tube 40 from D. C. supply 6 through the primary winding of a transformer 41. A grid bias resistance 42 is provided for tube 40. A condenser 43 and resistance 44 provide decoupling capacitance and resistance, respectively.

A transformer 45 supplied from A. C. supply 5 has one side of its secondary winding connected to the mid-tap of the secondary winding of transformer 41, whereas the other side of this winding is connected to the cathode of tube 40. A plate by-pass condenser 46 is connected in the external circuit between the plate and cathode of tube 40. The two diode plates to tube 40 are connected respectively to the respective ends of the secondary winding of transformer 41. The ends of the secondary winding of transformer 41 are connected respectively through condensers 48 and 48' to the grids of gas or vapor containing grid controlled rectifier tubes 49 and 49'.

As is well known to those skilled in the art, the average values of the anode currents flowing in the anode circuits of tubes 49 and 49' can be varied by varying the phase relationship between the voltages applied to their grids and anodes, respectively. Alternating voltage is applied to the grids of tubes 49 and 49' in in-phase relation through resistances 50 and 50' from one side of the secondary of a transformer 51. The other side of the secondary of transformer 51 is connected to the cathodes of tubes 49 and 49' and to corresponding ends of the secondary windings 52 and 52' of motor control transformers 53 and 53'. The other ends of transformer windings 52 and 52' are connected respectively to the plates of tubes 49 and 49'. Transformers 53 and 53' have divided primary windings 54 and 54' energized from the A. C. source 5. The voltage induced in the secondary windings 52 and 52' by primaries 54 and 54' serves to supply the required A. C. potential upon the plates of tubes 49 and 49'. The reversible follow-up motor in this form of the invention is illustrated as an A. C. compensated repulsion motor 55 having a main field winding 57 connected in the A. C. supply to the primary windings of transformers 53 and 53' and a compensating field winding 56 connected to these windings. The single pair of brushes of motor 55 are permanently short-circuited.

In use, any alternating signal voltage supplied from controller 2—3, due to relative movement of the sensitive and follow-up elements, is amplified by the triode portion of tube 40 and impressed by transformer 41, acting through condensers 48 and 48', upon the grids of grid controlled rectifier tubes 49 and 49' in 180° out of phase relation, so that the amplified signal is additive to the A. C. bias potential at one of the grids and subtractive at the other, depending upon the phase relation of the signal, i. e., upon whether the transformer element 3 is moving in one direction or the other with respect to the element 2, and the magnitude of such amplified displacement signal potential will depend at any time upon the relative angular displacement of these elements.

The diode portion of tube 40 serves as a rectifier in that it draws current from transformer 45 through the two halves of the secondary winding of transformer 41. When a displacement signal is being amplified by tube 40, the currents flowing in the two halves of the secondary winding of transformer 41 will be unequal because of the phase relations between the A. C. supply from transformer 45 to the diode plates and the A. C. signal applied to the grid of tube 40, i. e., when the signal potential is of one phase one of the diode plate circuits draws a large current, whereas the other diode plate circuit draws a small current, and when the phase of the signal potential reverses due to reversed relative displacement of the sensitive and follow-up elements, the large current is transferred to the other diode plate circuit.

Thus, an unbalanced D. C. component flows in the secondary of transformer 41, the magnitude of which depends on the relative displacement of the sensitive and follow-up elements, and the direction of which depends on the direction of such relative displacement. The presence of this D. C. component in the secondary of transformer 41, due to the resistance of its windings, causes a voltage drop across this secondary in phase with the displacement and proportional to the magnitude thereof, and if this D. C. component varies, a voltage is induced across the secondary of transformer 41, which induced voltage is in phase with the time rate of change of displacement, i. e., velocity. This induced voltage is applied to the condensers 48 and 48' and if this voltage is changing, the time rate of change, or the first derivative thereof with respect to time, is passed onto the grids of the grid controlled rectifiers 49 and 49' in 180° out of phase relation, i. e., a D. C. surge voltage corresponding to the second derivative of displacement with respect to time is applied to the grids of tubes 49 and 49'. If the relative displacement of the sensitive and follow-up elements is not changing, or changing uniformly, no such voltage will appear, but if the relative displacement of the elements is changing with acceleration or deceleration, such surge voltage will appear. Resistors 50 and 50' cooperate with condensers 48 and 48' in applying time derivative voltage to the grids of tubes 49 and 49', the said resistors completing the circuit for currents resulting from such voltages. The phase of the voltage supplied to the grids of tubes 49 and 49' is so adjusted that, in the absence of a signal potential, only a small standby current flows in the output circuits of tubes 49 and 49'.

When tube 49 is rendered conducting, the winding 52 is shorted, in effect, and motor 55 operates in one direction. The connections for motor 55 are from supply 5 through lead 59, main field winding 57, lead 60, lead 61 through one half of primary 54, lead 62 through compensating field winding 56, lead 63 through the other half of primary 54 and lead 64 back to the supply 5. When tube 49' is rendered conducting, the winding 52' of transformer 53' is shorted, in effect, and motor 55 operates in the opposite direction. The connections for motor 55 in this case are from supply 5 through lead 59, main field winding 57, lead 60 through one half of the primary 54', lead 65, lead 63 reversely through compensating field winding 56, lead 62, lead 66 through the other half of primary 54' and lead 64 back to the supply 5. The speed of operation of motor 55 at any time will depend upon the magnitude of the current flowing in the output of whichever tube 49 or 49' is operating at such time.

As long as the follow-up element is not displaced with respect to the sensitive element, no signal voltage is supplied to the grids of the grid controlled rectifier tubes 49 and 49', but as soon as relative displacement of these elements takes place, the amplified alternating signal potential from tube 40 and a D. C. surge potential dependent on the second time rate of change of displacement, i. e., $$\frac{d^2\theta}{dt^2}$$

or acceleration, are impressed on the grids of tubes 49 and 49' in 180° out of phase relation, so that the resultant of such potentials is additive to the A. C. bias supplied from transformer 51 at one of the grids, thereby shifting the phase of the resultant voltage supplied to this grid and causing current to flow in the output circuit of such tube, resulting in the rotation of follow-up motor 55 in the direction necessary to synchronize the sensitive and follow-up elements. The phase and magnitude of the combined D. C. derivative and A. C. displacement potentials determine the torque and speed of motor 55. The D. C. derivative potential acting in conjunction with the A. C. displacement potential serves to so control the motor 55 as to greatly reduce the damping or stopping period of the load driven thereby, the D. C. derivative potential having the effect of greatly reducing the inertia or energy stored in the system, so that the damping forces present are able to quickly dissipate such energy, thereby bringing the controlled object or follow-up element into synchronism with the controlling object or sensitive element in a dead beat manner and without hunting.

Owing to the manner in which the compensated repulsion motor 55 is connected in the circuit, the same remains relatively cool in use, which is highly desirable. The reason that this motor remains cool is because its compensating winding 56, i. e., the rotor current producing winding, carries substantially no current except when a displacement signal is actually being supplied by controller 2–3. When no signal is supplied by this controller, i. e., when tubes 49 and 49' are not passing current, it will be noted from an inspection of Fig. 2 that both sides of compensating winding 56 are at substantially the same potential, so that this winding does not carry or induce currents in the rotor of motor 55 and hence the latter does not heat up and consequently operates far more efficiently when called upon to operate the follow-up element.

The connections for motor 55 disclosed in Fig. 2 are especially valuable when used in continuously operable position control systems, such as that disclosed in application Serial No. 11,424 of two of the present inventors, because in such systems, by thusly keeping the motor cool, the same may be operated or loaded far above its rated capacity for short periods of time, thereby enabling the use of smaller motors and causing improvement in the accelerating ability of the motor as a result of its enhanced torque-inertia ratio.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In a follow-up system of the character described, sensitive and follow-up elements, a driving motor for said follow-up element, a control circuit for said driving motor, said control circuit having thermionic means for producing an amplified A. C. control potential responsive to the relative displacement of said elements, means cooperating with said thermionic means for producing a D. C. control potential responsive to a time derivative of such relative displacement, and grid controlled rectifiers responsive to said A. C. and D. C. control potentials for determining the speed and direction of operation of said driving motor.

2. In a follow-up system having a sensitive element, a follow-up element and means for driving said follow-up element, an electrical circuit for controlling said driving means, said electrical circuit comprising means for producing an alternating potential responsive to the relative displacement of said sensitive and follow-up elements, thermionic tube means for amplifying said alternating potential, grid controlled rectifier means for receiving said amplified alternating potential and for determining the operation of said driving means, and impedance means in the output circuit of said thermionic means, said impedance means comprising means including a transformer for producing a D. C. potential responsive to the first time derivative of the relative displacement of said elements, and a capacitance for receiving said D. C. first derivative potential and for applying a derived D. C. second derivative potential to said grid controlled rectifier means.

3. In a follow-up system of the character described, in combination, a plurality of elements arranged to move in synchronism, synchronizing means interconnecting said elements, said synchronizing means comprising means for setting up an alternating signal potential responsive to the relative displacement of said elements from synchronism, motive means for restoring synchronism between said elements, grid controlled rectifier means for controlling the supply of operating energy to said motive means, means for amplifying said alternating signal potential for applying the same to said grid controlled rectifier means, and impedance means, comprising a transformer connected to the output of said amplifying means and condensers connected to the output of said transformer, and cooperable with said amplifying means for applying a D. C. surge potential to said grid controlled rectifier means, said D. C. surge potential being responsive to a higher time derivative of said relative displacement and cooperating with said amplified signal potential in controlling the action of said rectifier means.

4. In a follow-up system of the character described, in combination, a source of A. C., a plurality of elements arranged to move in synchronism, synchronizing means interconnecting said elements, said synchronizing means comprising means for setting up an alternating signal potential derived from said source of A. C. responsive to the relative displacement of said elements from synchronism, motive means for restoring synchronism between said elements, a pair of grid controlled rectifiers for controlling the supply of operating energy to said motive means, a thermionic amplifier and rectifier for amplifying said alternating signal potential and for rectifying current supplied from said source of A. C. to produce a D. C. surge potential responsive in magnitude and direction to the magnitude and direction of the relative displacement of said elements, and impedance means, comprising a transformer connected to the output of said thermionic amplifier and rectifier and condensers connected to the output of said transformer, said transformer serving to produce the first time derivative of said D. C. surge potential for application to said condensers in 180° out of phase relation, and said condensers serving to pass on the second time derivative of said D. C. surge potential for application to said rectifiers in 180° out of phase relation along with said amplified alternating signal potential.

5. In a control system, a source of A. C., an A. C. compensated repulsion motor having main and compenating field windings arranged to be supplied from said A. C. source, grid controlled rectifier means for controlling the supply of operating energy from said source to said field windings, means for producing an A. C. signal potential derived from said source, and thermionic means connected to said rectifier means and arranged for amplifying and rectifying said signal potential, whereby A. C. and D. C. control potentials are applied to said rectifier means.

6. In a control system, a source of A. C., an A. C. compensated repulsion motor having main and compensating field windings arranged to be supplied from said A. C. source, grid controlled rectifier means for controlling the supply of operating energy from said source to said field windings, transformer means having its primary included in the connection between said source and said main and compensating field windings, said transformer means having its secondary connected in the output of said rectifier means, means for producing an A. C. signal potential derived from said source, and thermionic means connected to said rectifier means and arranged for amplifying and rectifying said signal potential, whereby A. C. and D. C. control potentials are applied to said rectifier means.

7. In a control system, a source of A. C., an A. C. compensated repulsion motor having main and compensating field windings arranged to be supplied from said A. C. source, a pair of grid controlled rectifiers arranged in opposition for controlling the supply of operating energy from said source to said field windings, means for supplying signal control potentials to said rectifiers, a pair of transformers having divided primary windings included in the connection between said source and said main and compensating field windings, said transformers having their secondary windings connected, respectively, in the cathode-anode circuits of said rectifiers, said motor compensating field winding being so connected between the divided primary windings of said transformers that the same carries substantially no current when said rectifiers are idle, whereby said repulsion motor remains relatively cool in use.

8. In a position control system having a controlling object, a controlled object and means for driving said controlled object, an electrical circuit for controlling said driving means, said electrical circuit comprising means for producing an alternating potential responsive to the relative displacement of said controlling object with respect to said controlled object, thermionic tube means for detecting the phase of said alternating potential and for amplifying the same, grid controlled rectifier means for receiving said amplified alternating potential and for determining the operation of said driving means, and impedance means in the output circuit of said thermionic tube means, said impedance means serving to supply a D. C. potential responsive to a higher time derivative of the relative displacement of said controlling object with respect to said controlled object for application to said grid controlled rectifier means.

9. In a position control system of the character described, in combination, a plurality of objects arranged to move in synchronism, synchronizing means interconnecting said objects, said synchronizing means comprising means for setting up an alternating signal potential responsive to the relative displacement of said objects from synchronism, motive means for restoring synchronism between said objects, grid controlled rectifier means for controlling the supply of operating energy to said motive means, means for amplifying said alternating signal potential for applying the same to said grid controlled rectifier means, and impedance means cooperable with said amplifying means for applying a D. C. surge potential to said grid controlled rectifier means, said D. C. surge potential being responsive to a higher time derivative of said relative displacement and cooperating with said amplified signal potential in controlling the action of said rectifier means.

10. In a position control system of the character described, a controlling object, a controlled object, said objects being capable of relative movement, a source of power operatively associated with said controlled object, an alternating potential producing means operatively associated with one of said objects, a potential responsive means operatively associated with the other of said objects, a continuously acting control circuit operatively associated with said potential responsive means, said control circuit comprising thermionic means for detecting and amplifying the potentials derived from said potential producing means, impedance means connected in the output circuit of said thermionic means for rectifying such potentials, means for deriving a time derivative potential from said rectified potentials, and grid controlled rectifier means controlled by said amplified and derivative potentials, said grid controlled rectifier means serving to control said source of power, whereby said control circuit is continuously responsive to a predetermined function of relative displacement of said objects and of a higher time derivative of said predetermined function.

WILLIAM T. COOKE.
FRANCIS L. MOSELEY.
CARL A. FRISCHE.